(No Model.) 2 Sheets—Sheet 1.
J. B. ELLIOTT & R. J. MAWHINNEY.
DEVICE FOR DETACHABLY SECURING TYPE WRITING MACHINES TO DROPPING LEAVES OF CABINETS, &c.
No. 558,789. Patented Apr. 21, 1896.
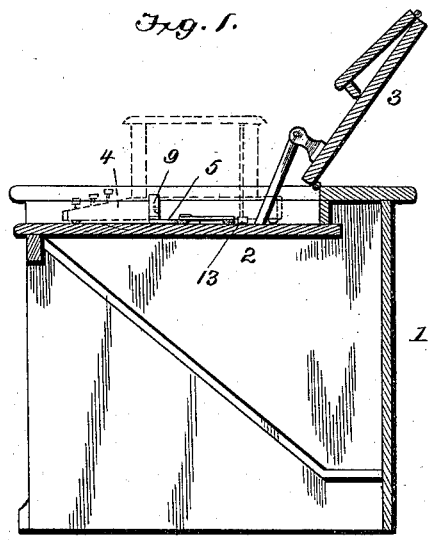
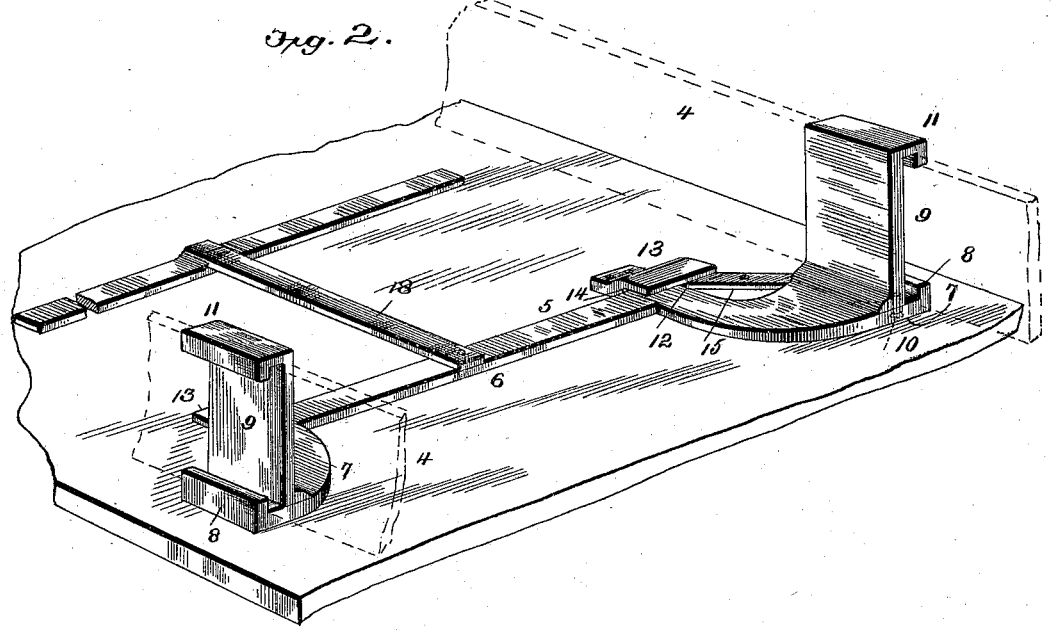
Witnesses
John Davirie
Joseph C. Stack
Inventors
Jerre B. Elliott
Robert J. Mawhinney

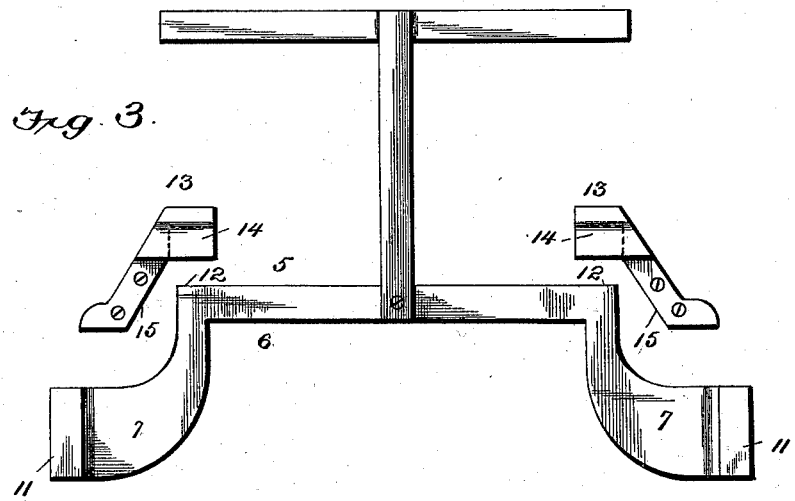

UNITED STATES PATENT OFFICE.

JERRE B. ELLIOTT AND ROBERT J. MAWHINNEY, OF WASHINGTON, DISTRICT OF COLUMBIA.

DEVICE FOR DETACHABLY SECURING TYPE-WRITING MACHINES TO DROPPING LEAVES OF CABINETS, &c.

SPECIFICATION forming part of Letters Patent No. 558,789, dated April 21, 1896.

Application filed January 24, 1893. Serial No. 459,556. (No model.)

*To all whom it may concern:*

Be it known that we, JERRE B. ELLIOTT and ROBERT J. MAWHINNEY, citizens of the United States, residing at Washington, in the District of Columbia, have invented certain new and useful Improvements in Devices for Detachably Securing Type-Writing Machines to the Dropping Leaves of Cabinets or Other Desks; and we do hereby declare the following to be a full, clear, and exact description of the invention, such as will enable others skilled in the art to which it appertains to make and use the same.

This invention relates to certain improvements in devices intended to secure type-writing machines to the dropping or support leaf of cabinets or desks which are now in general use.

The invention is particularly designed to be used with the Remington type-writer, but may be applied to other machines of a like class.

At present the Remington machine is rigidly secured to the dropping leaf by means of hooks engaging the bed-frame of the machine and having screw-threaded ends which pass through the leaf and are secured by suitable bolts. This compresses the rubber feet, increasing the noise, causing the operator to use a hard finger-touch, and preventing the machine from being moved, these features being very objectionable. Further, the projecting ends of the hooks and the bolts have been found to be a source of annoyance, discomfort, and injury to the operator when the type-writer is not in use and the leaf lowered.

The object of our invention is to provide means for lessening the noise and hard finger-touch in operating a type-writing machine and for detachably securing the same to the leaf or support, so that it will be securely and firmly held when the said leaf is lowered, will have no projections on the under side of the leaf, and, further, when the leaf or support is raised and the machine in position to be operated the operator will be able to disengage the same from the securing device and move it to any desired point upon said leaf.

It further consists in certain novelty in the details of construction, all of which we will now proceed to point out and describe, reference being had to the accompanying drawings, in which—

Figure 1 is a vertical cross-section of a cabinet or desk, showing the leaf raised, the type-writing machine being indicated thereon by dotted lines. Fig. 2 is a perspective of part of the leaf, showing the securing devices in position, the side bars of the bed-frame being indicated by dotted lines. Fig. 3 is a plan view of the securing devices.

Referring to said drawings, the numeral 1 indicates the cabinet or desk, 2 the dropping leaf, and 3 the closing cover. It is not necessary to further describe said cabinet, as it forms no part of the invention.

The numeral 4 indicates the lower side bars of the bed-frame of the machine. To said bars is secured a flat horizontal frame 5, extending under the bed-frame and consisting of a cross-bar 6 of less length than the width of the machine and having at each side extensions 7, arranged at an angle to said bar. The extremity of each extension is provided with a flange 8, which engages the lower outer edges of the side bars. 9 are uprights secured to said extensions by screws 10 or in any other suitable manner, the upper ends of said uprights being provided with an angular flange 11, which engages with the upper edges of the side bars. By means of this construction the horizontal frame 5 is attached to the under side of the type-writing machine and is adapted to move over the dropping leaf but not rest upon the same.

12 indicate angular shoulders at the ends of the cross-bar 6.

13 indicate brackets secured to the upper side of the dropping leaf and provided with rectangular recesses 14. Said brackets are so arranged upon the leaf that the shoulders 12 of the frame 5 will engage with the recesses in the brackets and hold the machine securely upon the table when the leaf is lowered, and at the same time permit the operator to readily and quickly disengage the machine and move it to any desired part of the leaf. The brackets are also provided with beveled guides 15, with which the shoulders 12 engage when the machine is pushed back, thus easily causing it to engage the recesses in the brackets and lock the machine to the leaf. To the cross-bar 6 is secured a T-shaped arm 18, forming a stop, the cross-piece of said arm or stop being parallel with the cross-bar 6 and adapted to engage the brackets 13 to prevent the machine from being drawn too far forward upon the hinged table or leaf. The brackets are also arranged so that there can be a slight play of the cross-bar 6 between the same, thus facilitating the locking of the machine to the leaf.

When it is desired to ship the cabinet with the machine attached, the latter may be secured to the drop-leaf with a strong cord passing around the brackets secured to the dropping leaf and the forward upright bed-frames of the type-writing machine or in any other desired manner.

It will be apparent that the device we employ for detachably securing the machine to the dropping leaf will securely hold the same to said leaf and at the same time permit the operator to move the machine upon the same to the most convenient position. This will be readily recognized as of great advantage by all operators of type-writing machines.

Having thus described our invention, what we claim as new, and desire to secure by Letters Patent, is—

1. The combination with the locking-frame secured to the under side of a type-writing machine, of recessed locking-brackets secured to the dropping leaf of a cabinet whereby the machine may be detachably secured to said leaf, substantially as shown and described and for the purpose set forth.

2. The combination with the horizontal locking-frame secured to the under side of a type-writing machine consisting of a cross-bar having shoulders at its ends, of the recessed locking-brackets secured to the upper side of the dropping leaf of a cabinet, with which the cross-bar of the locking-frame is adapted to engage, and detachably secure said machine to the leaf, substantially as shown and described and for the purpose specified.

3. The combination with the horizontal locking-frame secured to the under side of a type-writing machine, consisting of a cross-bar having shoulders at each end, of the locking-brackets secured to the upper side of the dropping leaf of a cabinet and having rectangular recesses and beveled guides, substantially as shown and described.

4. The combination with the horizontal locking-frame secured to the under side of a type-writing machine, consisting of the cross-bar having secured thereto a T-shaped stop, of the recessed locking-brackets secured to the upper side of the leaf of a cabinet, all constructed, arranged and operating, substantially as shown and described.

In testimony whereof we affix our signatures in presence of two witnesses.

JERRE B. ELLIOTT.
ROBERT J. MAWHINNEY.

Witnesses:
ALEX. S. STEUART,
FRANK D. JOHNS.